US011443323B2

(12) United States Patent
Wang et al.

(10) Patent No.: US 11,443,323 B2
(45) Date of Patent: Sep. 13, 2022

(54) SYSTEM AND METHOD FOR SECURE TRANSACTIONS WITH A TRUSTED EXECUTION ENVIRONMENT (TEE)

(71) Applicant: Samsung Electronics Co., Ltd., Suwon-si (KR)

(72) Inventors: Yifei Wang, San Jose, CA (US); An Liu, Dublin, CA (US); Pai Peng, San Jose, CA (US); Peng Ning, Saratoga, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 225 days.

(21) Appl. No.: 16/122,705

(22) Filed: Sep. 5, 2018

(65) Prior Publication Data

US 2019/0279221 A1    Sep. 12, 2019

Related U.S. Application Data

(60) Provisional application No. 62/639,934, filed on Mar. 7, 2018.

(51) Int. Cl.
| | |
|---|---|
| *G06Q 20/40* | (2012.01) |
| *G06Q 20/38* | (2012.01) |
| *G06Q 20/32* | (2012.01) |
| *G06F 21/57* | (2013.01) |
| *H04L 9/00* | (2022.01) |

(Continued)

(52) U.S. Cl.
CPC ....... *G06Q 20/40975* (2013.01); *G06F 21/57* (2013.01); *G06Q 20/3226* (2013.01); *G06Q 20/3278* (2013.01); *G06Q 20/3821* (2013.01); *G06Q 20/3823* (2013.01); *H04L 9/006* (2013.01); *H04L 9/321* (2013.01); *H04L 63/18* (2013.01); *H04B 5/0031* (2013.01)

(58) Field of Classification Search
None
See application file for complete search history.

(56) References Cited

U.S. PATENT DOCUMENTS

| | | | |
|---|---|---|---|
| 8,850,527 B2 | 9/2014 | Chew et al. | |
| 9,390,034 B1 * | 7/2016 | Fair | G06F 13/14 |

(Continued)

FOREIGN PATENT DOCUMENTS

| | | |
|---|---|---|
| DE | 10 2015 006907 A1 | 12/2016 |
| WO | 2016192842 A1 | 12/2016 |
| WO | 2017186445 A1 | 11/2017 |

OTHER PUBLICATIONS

ISA/KR, International Search Report and Written Opinion of the International Searching Authority, International Application No. PCT/KR2019/011316, dated Dec. 9, 2019, 8 pages.

(Continued)

*Primary Examiner* — Neha Patel
*Assistant Examiner* — Nicholas K Phan (57) ABSTRACT

A mobile communications device includes a near field communications (NFC) port and processor. The processor executes a trusted application within a trusted execution environment (TEE) for processing sensitive data. Additionally, the processor executes a NFC driver within the TEE for providing a secure channel between the trusted application and the NFC port such that sensitive data being exchanged across the secure channel are inaccessible to other processes being executed by the processor.

18 Claims, 6 Drawing Sheets

(51) Int. Cl.
  *H04L 9/32* (2006.01)
  *H04L 9/40* (2022.01)
  *H04B 5/00* (2006.01)

(56) References Cited

U.S. PATENT DOCUMENTS

| | | | |
|---|---|---|---|
| 9,705,886 | B2 | 7/2017 | Sharma et al. |
| 9,871,560 | B2 | 1/2018 | Roehrle et al. |
| 10,339,546 | B2 * | 7/2019 | Dereszynski ...... G06Q 30/0204 |
| 11,138,027 | B2 * | 10/2021 | Li .......................... G06F 9/445 |
| 2016/0086549 | A1 * | 3/2016 | Eom .................... G09G 3/3233 |
| | | | 345/690 |
| 2016/0099752 | A1 | 4/2016 | Lee et al. |
| 2016/0127857 | A1 | 5/2016 | O'Donoghue et al. |
| 2016/0140535 | A1 | 5/2016 | Noe et al. |
| 2016/0217467 | A1 | 7/2016 | Smets et al. |
| 2016/0269080 | A1 | 9/2016 | Ballesteros et al. |
| 2017/0068953 | A1 * | 3/2017 | Kim ..................... G06Q 20/382 |
| 2017/0083882 | A1 | 3/2017 | Kim et al. |
| 2017/0118215 | A1 | 4/2017 | Varadarajan et al. |
| 2017/0132618 | A1 * | 5/2017 | Hong ................. G06Q 20/3229 |
| 2017/0213211 | A1 | 7/2017 | Sibert et al. |
| 2018/0150826 | A1 | 5/2018 | Schwartz et al. |
| 2018/0165673 | A1 * | 6/2018 | Francis .................... G06F 21/74 |
| 2018/0287802 | A1 * | 10/2018 | Brickell ................ H04L 9/3263 |
| 2019/0138701 | A1 * | 5/2019 | Bartels ................ H04W 12/065 |
| 2019/0182452 | A1 * | 6/2019 | Choudha ............... G06F 3/0485 |
| 2020/0126064 | A1 * | 4/2020 | Chang .................. H04B 5/0037 |

OTHER PUBLICATIONS

Supplementary European Search Report dated Aug. 16, 2021 in connection with European Patent Application No. 19 85 8133, 8 pages.

* cited by examiner

SYSTEM AND METHOD FOR SECURE TRANSACTIONS WITH A TRUSTED EXECUTION ENVIRONMENT (TEE)

CROSS-REFERENCE TO RELATED APPLICATION

The present application claims the benefit of U.S. Provisional Patent Application Ser. No. 62/639,934, filed Mar. 7, 2018, which is incorporated herein by reference in its entirety for all purposes.

TECHNICAL FIELD

The present disclosure relates in general to mobile communications devices and in particular to a system and method for implementing secure transactions with a mobile communications device.

BACKGROUND

Many mobile platforms (e.g., ANDROID™, WINDOWS MOBILE OS, etc.) use a technology called host card emulation (HCE), which allows normal mobile applications to process data and communicate with a point of sale (POS) terminal through near field communications (NFC). Disadvantageously, part of the payment channel within the mobile device is exposed in the operating system (OS) framework layer, such that the payment channel may be compromised and data can be stolen by malicious applications software (i.e., an "app"). One particular example where payment data can be exposed by a vulnerable payment channel is a mobile wallet, such as ANDROID PAY™ or SAMSUNG PAY™, although the threat may extend to other scenarios in which sensitive data are being exchanged through a HCE to NFC port channel.

SUMMARY

This disclosure provides a system and method for securing transactions, which are particularly suitable for mobile platforms, although not limited thereto.

In one exemplary embodiment, HCE transactions may be secured using a security foundation within a trusted execution environment (TEE). In another exemplary embodiment, an NFC port (e.g., an NFC hardware chip or other circuit or device for exchanging data via an NFC link) may be controlled from within the TEE instead of through a host OS, allowing for trusted communication between mobile wallets and a TEE, so that a host OS, including apps, the framework, and the kernel, cannot compromise the channel or steal the data.

Another particular representative embodiment is a mobile communications device, which includes a near field communications (NFC) port and processor. The processor executes a trusted application within a trusted execution environment (TEE) for processing sensitive data. Additionally, the processor executes a NFC driver within the TEE for providing a secure channel between the trusted application and the NFC port such that sensitive data being exchanged across the secure channel are inaccessible to other processes being executed by the processor.

A further particular representative embodiment is a method of performing a transaction within a mobile device having a near field communications (NFC) port. A trusted application executes within a trusted execution environment (TEE) to process sensitive data. An NFC driver executes within the TEE to provide a secure channel between the trusted application and the NFC port such that sensitive data being exchanged across the secure channel are inaccessible to other processes being executed within the mobile device.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF DRAWINGS

For a more complete understanding of the principles present invention, and the advantages thereof, reference is now made to the following descriptions taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
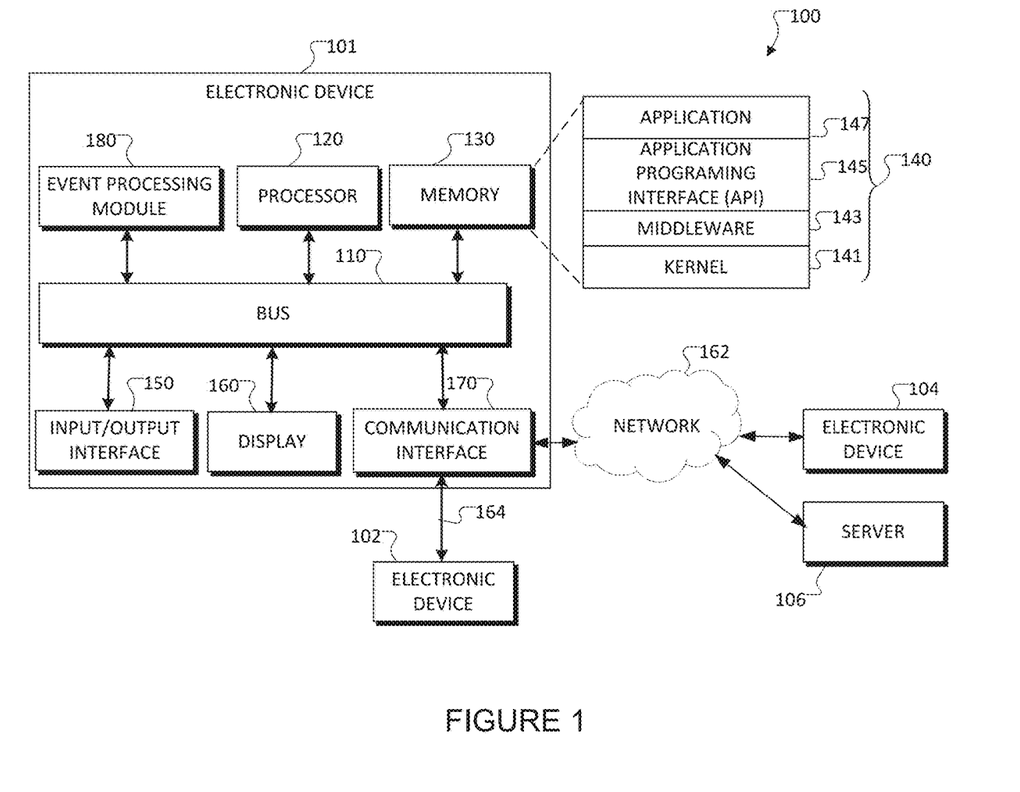
FIG. 1 is a high-level diagram of a portion of a networked communications system suitable for describing exemplary embodiments of the principles of the present disclosure.

Referring to FIG. 1, according to an embodiment of the present disclosure, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add another component.

For example, examples of the electronic device 110 according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device 110 may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device 110 may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device 110 may at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the electronic device 110 may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

As used herein, the term "user" may denote a human or another device (e.g., an artificial intelligent electronic device) using the electronic device 110.

Returning to FIG. 1, the bus 110 may include a circuit for connecting the components 120 to 180 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 or 164 through wireless or wired communication to communicate with the external electronic device.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 may detect the mounting in the HMD and operate in a virtual reality mode. When the electronic device 101 is mounted in the electronic device 102 (e.g., the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 may be independently operated without a separate communication function, according to an embodiment of the present disclosure.

The server 106 may support to drive the electronic device 101 by performing at least one of operations (or functions) implemented on the electronic device 101. For example, the server 106 may include an event processing server module (not shown) that may support the event processing module 180 implemented in the electronic device 101.

For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners.

For example, according to an embodiment of the present disclosure, the event processing module 180 may process information related to an event, which is generated while the electronic device 101 is mounted in a wearable device (e.g., the electronic device 102) to function as a display apparatus and to operate in the virtual reality mode, to fit the virtual reality mode and display the processed information. When the event generated while operating in the virtual reality mode is an event related to running an application, the event processing module 180 may block the running of the application or process the application to operate as a background application or process.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present disclosure in interoperation with at least one program 140 stored in the memory 130.

Exemplary embodiments described herein are not meant to be limiting and merely illustrative of various aspects of the disclosure. While exemplary embodiments may be indicated as applicable to a particular device category (e.g., TVs, etc.) the processes and examples provided are not intended to be solely limited to the device category and can be broadly applicable to various device categories (e.g., appliances, computers, automobiles, etc.)

In one embodiment, as part of a setup process, a user may be presented with applications or services on a connected device (e.g., mobile device, smartphone, tablet, laptop, desktop, or similar device) which may be installed on the device being setup. The applications may be supported by effortless login (also referred to herein as silent login). When the application is selected on the connected device, the process may deep link to the mobile application installed on the connected device or launch a secure web browser to authenticate the user. Upon successful authentication, a token may be delivered to the connected device allowing the connected device to login without having to enter authentication information.

For implementing sensitive transactions through an NFC port, such as payment transactions between a mobile device and a point-of-sale (POS) terminal, different hardware/software implementations are possible. One option is to use a secure element (SE), which allows data to be exchanged directly between the SE and the NFC controller without access by the host OS. However, SE-based systems are difficult to develop and typically cannot be accessed by third-party developers. Another option is to use pluggable hardware (e.g., an NFC front-end and/or security modules), which allows an app to exchange NFC data under tight control. This option, however, not only requires additional hardware, but also requires set-up certificates and a protocol for both the app and the hardware to enable security and other operating features.

Another option for implementing secure NFC transactions is to use an HCE-service, although an HCE-service does not provide the same level of security as an SE. Generally, payment data (e.g., primary credit or debit number, expiration date, and cryptogram) are generated in a trusted execution environment (TEE) in response to a request through an HCE service running in the OS user space. Those data are then sent back through the HCE service and then to the NFC controller. Under this set of conditions, the data are not secure, since the OS can access those data during the exchange with the NFC controller. This problem is illustrated in FIG. 2.

Figure 2:
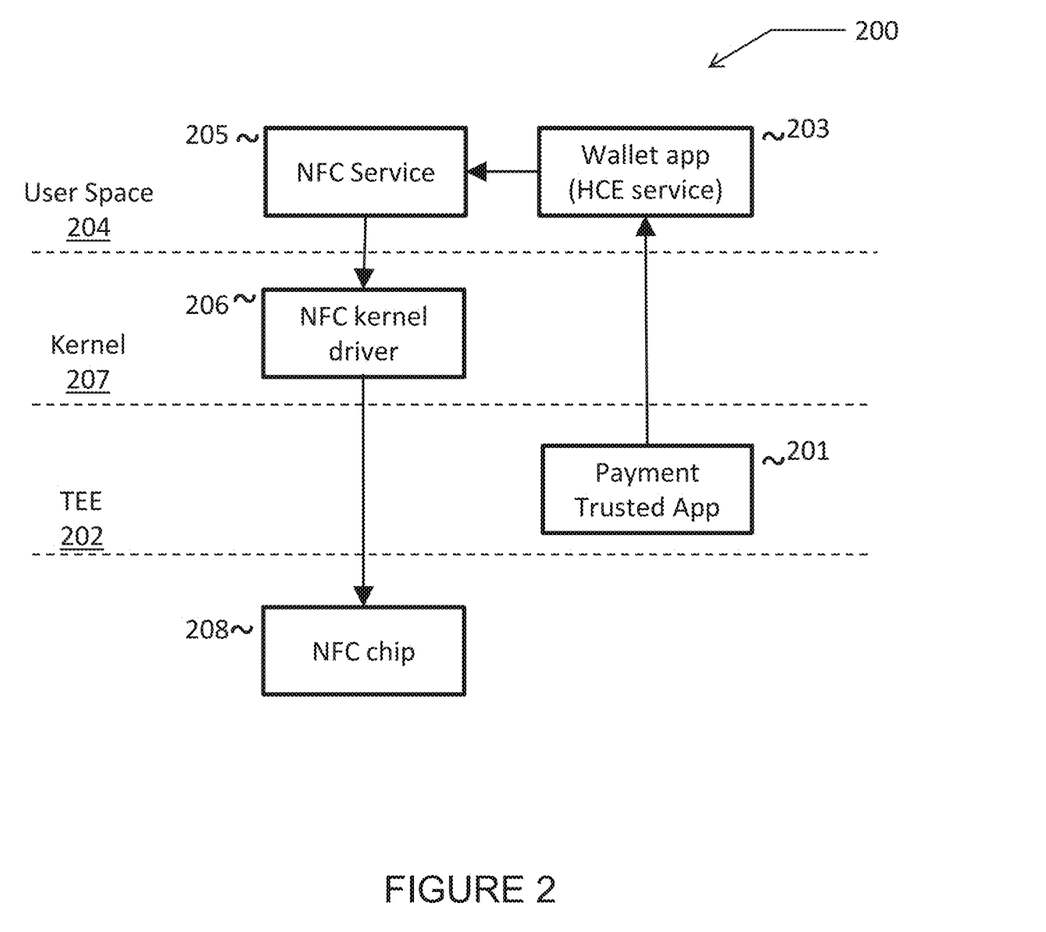
FIG. 2 is a block diagram illustrating the typical operation of a conventional HCE service.

FIG. 2 illustrates the operation of a typical conventional HCE-based system 200 during a payment transaction. The payment credentials are generated by a payment trusted app 201 running within a TEE 202. The credentials are sent to a wallet app (HCE service) 203 running within the OS user space 204. The data are then transmitted from wallet app 203 to the NFC service 205, also running within OS user space 204. The NFC driver 206 in the kernel space 207 allows the NFC service 205 to interact with the NFC hardware chip 208.

Consequently, the channel between the wallet app 203 and the NFC kernel driver 205 is completely exposed in the user space 204 and any software/firmware program or app that has privilege may be able to interfere with or monitor any transaction being implemented through the channel. In other words, a program or app having access to the channel may copy, modify, or tamper with the data being exchanged between wallet app 203 and NFC kernel driver 206.

Figure 3:
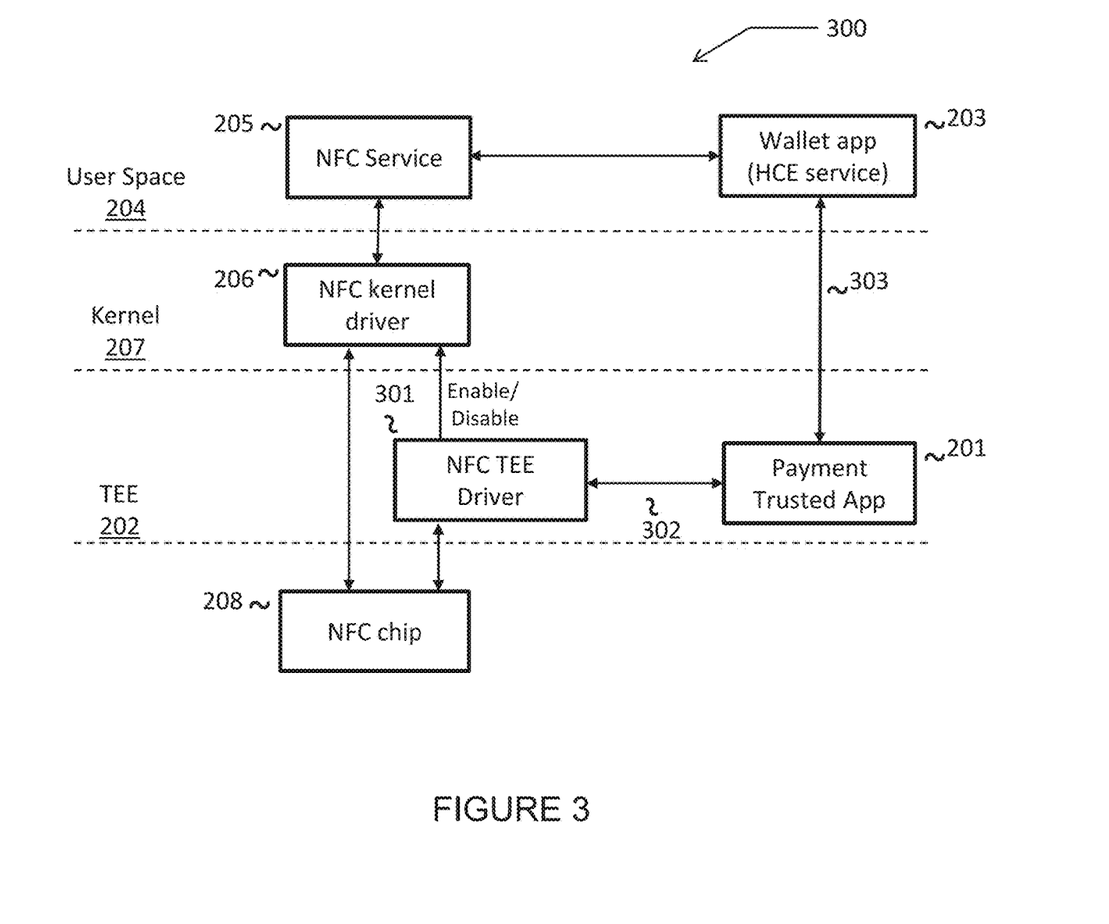
FIG. 3 is a block diagram illustrating an exemplary communications system with TEE-based NFC control according to an embodiment of the principles of the disclosure.

It has been discovered that building a trusted security foundation outside of a normal operating system may mitigate potential threats to HCE-based transactions when the payment channel is compromised by exposure in the OS framework layer, as illustrated by FIG. 3.

FIG. 3 illustrates an exemplary system 300 with a TEE-based NFC control, according to an embodiment of the disclosure. For illustrative purposes, a payment transaction is being implemented by system 300, although the principles of the present disclosure are not limited to payment systems. For example, system 300 could also be used to transfer personal identification data (e.g., passport or driver's license number), electronic key data, or any other form of sensitive information being exchanged between an NFC port and an app running within a TEE.

In exemplary system 300, sensitive data generated by payment trusted app 201 are exchanged with NFC hardware chip 208 through an NFC driver 301 executing within TEE 202 to provide a secure channel (data path) 302. In addition, NFC TEE driver 301 selectively enables and disables NFC kernel driver 206 within kernel space 207. (The NFC TEE driver 301 always has higher privilege over the OS kernel 207 such that NFC TEE driver 301 controls the non-secure data path through NFC kernel driver 206, notwithstanding any actions taken by other apps or programs executing within OS kernel 207.)

In some embodiments, the payment trusted app 201 directly calls the NFC TEE driver 301 and then exchanges data with the NFC driver 301 using the secured channel 302. In other embodiments, the wallet app 203 may enable the NFC TEE driver 301, for example through an API, and then command payment trusted app 201 exchange the sensitive data with NFC Tee driver 301 via the secure channel 302. In further embodiments, the payment trusted app 201 may enable the NFC TEE driver 301 when sensitive data are being exchanged and then sends the sensitive data to the NFC TEE driver 301 via the secure channel 302.

The embodiment of system 300 of FIG. 3 allows for the transmission of sensitive data, which are preferably, but not necessarily, encrypted, entirely through the TEE 202. In the example of a payment system, the sensitive data may be an application protocol data unit (APDU) (e.g., a unit of data containing, for example, payment credentials, including digital primary number, application cryptogram, card expiration, and so on). Consequently, the host OS, including applications and other programs executing in the kernel space 206 and the user space 204, cannot access the sensitive data being exchanged between payment trusted app 201 and NFC hardware chip 208.

Although non-sensitive or non-encrypted data may be exchanged through NFC TEE driver 301 in system 300, non-sensitive data may also be exchanged between wallet app 203 and NFC chip 208 through a lower security data path including NFC service 205 and NFC kernel driver 206. The use of this lower security data path allows for improved system performance (e.g., lower processing overhead) when higher data security is unnecessary.

Figure 4:
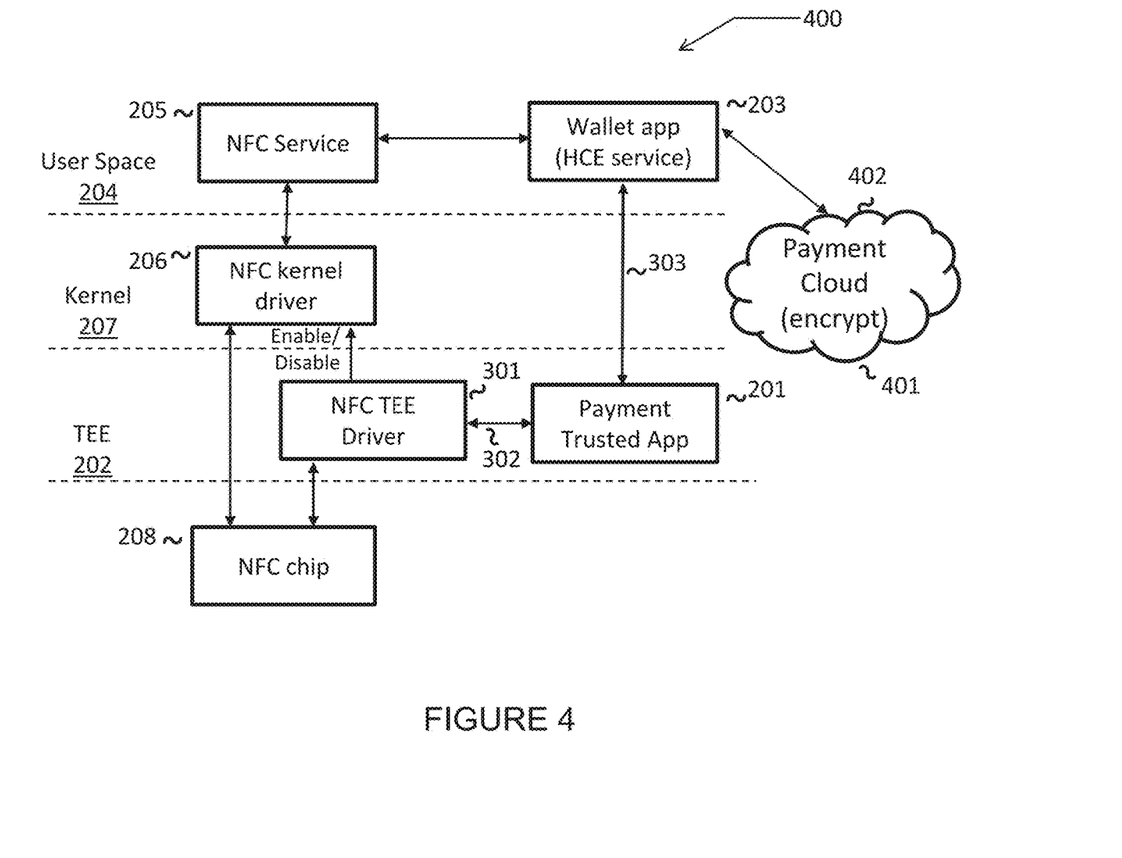
FIG. 4 is a block diagram of an exemplary communications system with TEE-based NFC control, with cloud credentials accessed by a wallet, according to an embodiment of the principles of the disclosure.

FIG. 4 illustrates an exemplary system 400 with cloud credentials from a payment (wallet) cloud 401 accessed by the wallet 202 through a secure channel 402. To meet a higher security requirement, system 400 can allow a third party to encrypt credentials at the device level or end-to-end between a payment server or payment cloud and the TEE NFC driver 301. In this example of a payment system, the encrypted payment data pass through wallet app 203, which cannot decrypt or otherwise modify those data, to payment trusted app 201. As such, the sensitive data being exchanged are completely protected against access by apps and other programs executed within OS user space 204 and OS kernel 207.

It should be recognized that the data path between payment cloud 401 and payment trusted app 201 does not necessarily have to pass through wallet app 203. In alternate embodiments of the principles of the present disclosure, another suitable software program or app could provide the interface between payment cloud 401 and payment trusted app 201, given that the secure data is not accessible by any program or app operating between payment cloud 401 and payment trusted app 201.

In one embodiment of the inventive principles, to switch to the secure operating mode, an SMC call is made to NFC TEE driver 301, which opens and locks the i2c bus. The NFC data is then serialized by NFC TEE driver 301 and then written to the i2c bus in accordance with the specification of NFC hardware chip 208.

Furthermore, system 400 also allows the wallet cloud 401 to verify the public certificate of the TEE 202 with root certificate authority (CA), so that wallet cloud 401 can exchange the key with NFC TEE driver 301, and sign and encrypt the credential with public key infrastructure (PKI). Mobile wallet 202 can send template APDU with encrypted credentials received from the wallet cloud 401 to the NFC TEE driver 301. The NFC TEE driver 301 receives the template APDU and encrypted credential, reconstructs the APDU, and sends it to NFC hardware chip 207.

Advantageously, embodiments of the principles of the disclosure provide a higher level of security under a number of different operating scenarios. For example, these principles can support various mobile payment apps, including both token and non-token based mobile payment apps, using NFC TEE driver 301 and the secure channel 302 as the payment channel. Additionally, to optimize performance, mobile wallet 203 can select the secure channel 302 to transmit sensitive data. Mobile wallet 203 can also transmit any APDU data including credentials and non-sensitive data through secure channel 302. Finally, NFC TEE driver 301 may be configured to have the higher control over the host OS kernel, wherein NFC TEE driver 301 first disables access by the host OS to NFC hardware chip 208 by disabling NFC kernel driver 206 before sending data.

Figure 5:
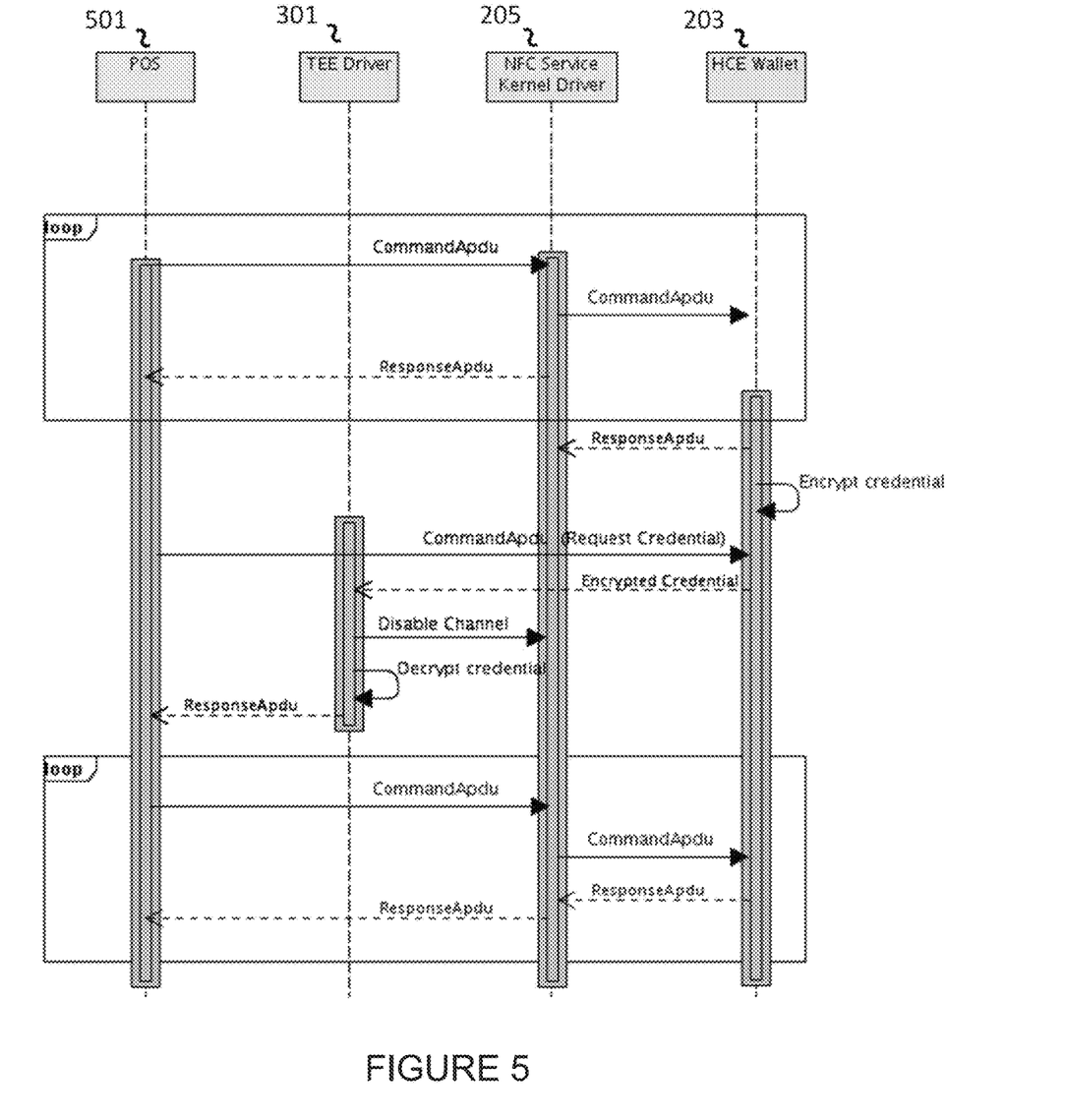
FIG. 5 is a diagram illustrating the operation of a representative security protocol between a mobile wallet and TEE-based NFC driver according to the principles of the present disclosure.

FIG. 5 is a sequence diagram illustrating an exemplary exchange of APDU data using either system 300 or system 400 discussed above. For discussion purposes, a commercial transaction between a mobile device and a POS terminal 501 is shown, although the principles of the disclosure are not limited thereto and can be equally applied to a wide range of scenarios where sensitive data must be exchanged between an NFC port and an onboard app or program without monitoring or interference from other apps or programs operating within the kernel or user spaces.

In FIG. 5, the POS terminal 501 may send a command (CommandApdu) to the NFC service kernel driver 205, which is then passed to the wallet app 203. The NFC service kernel driver 206 may optionally provide a response (ResponseApdu) to the POS terminal 501. In addition, the wallet app 203 may also optionally provide a response to the NFC service kernel driver 206. This initial sequence of commands and responses may loop and may be used, for example, to exchange non-sensitive data for such purposes as link management and the exchange of non-sensitive end-user information.

Encrypted credentials may be generated by payment trusted app 201 running within TEE 202 (FIG. 3), as discussed further below, or received from an external source (e.g., cloud wallet 401 of FIG. 4). When the POS terminal 501 provides a command to request the credential, the wallet app 203 may provide the encrypted credential to the NFC TEE driver 301 through secure channel 302. The NFC TEE driver 301 may selectively disable the unsecure channel through the NFC service kernel driver 206, then decrypt the credential and provide a response to the POS terminal 501 through the secure channel and the NFC hardware chip 207.

Subsequently, the POS terminal 501 may provide a command to the NFC service kernel driver 206, which is then passed to the wallet app 203, and the wallet app 203 may provide a response to the NFC service kernel driver 206, which then may provide a response to the POS terminal 501. This sequence of commands and responses may also be performed in a loop to implement non-sensitive operations such as link management and the exchange of non-sensitive end-user information.

Figure 6:
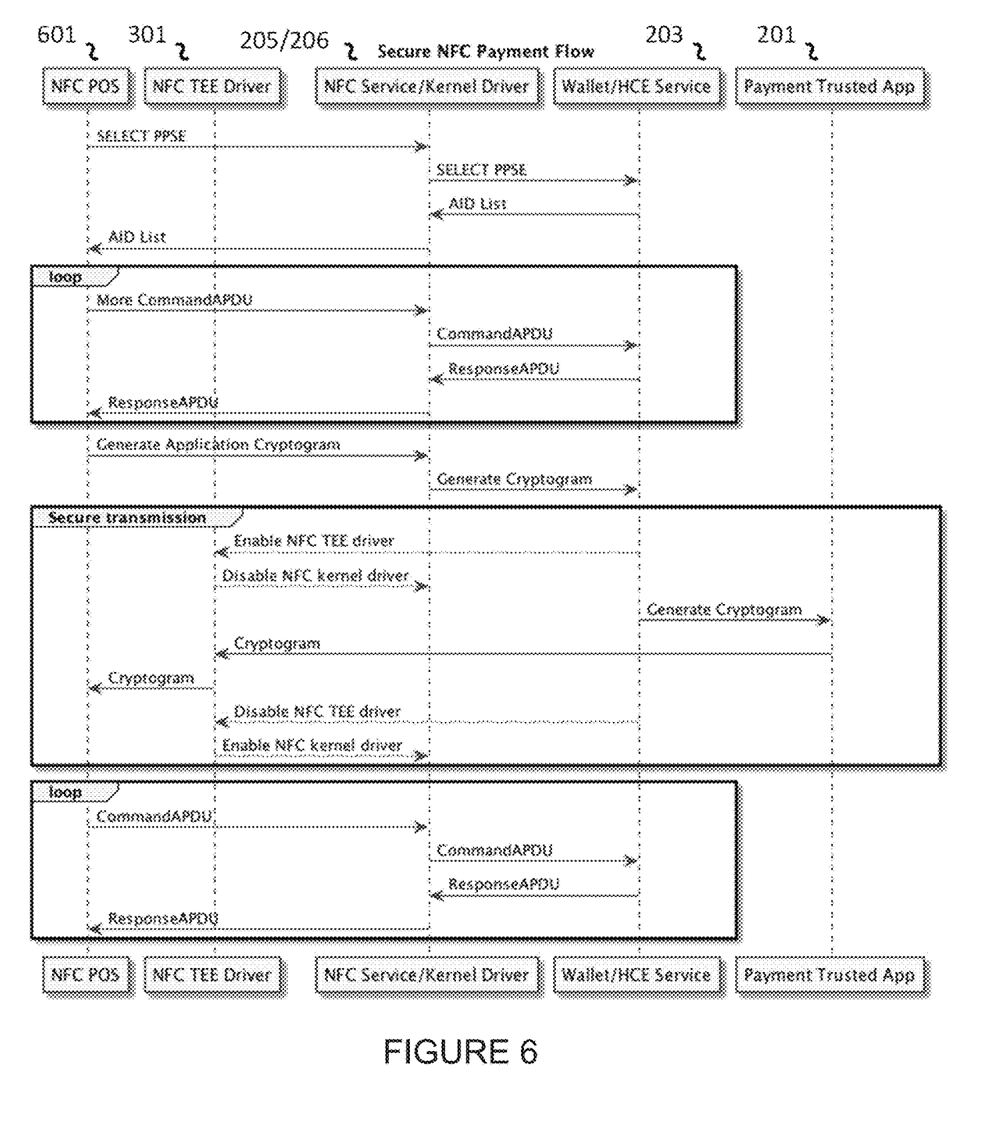
FIG. 6 is a diagram of a representative payment transaction in which the payment credentials are generated on the mobile device itself according to an embodiment of the principles of the present disclosure.

FIG. 6 is a diagram of a representative payment transaction in which the payment credentials are generated on the mobile device itself according to an embodiment of the principles of the present disclosure. In this example, the transaction begins when an NFC POS terminal 601 transmits a Select Payment Proximity System environment (PPSE) command to the mobile terminal through NFC hardware chip 208. The Select PPSE command is passed, as non-sensitive data, through NPC kernel driver 206 and NFC service 205 to wallet app 203. Wallet app 203 and NPC kernel driver 206 then return an Application Identifier (AID) list to the POS terminal 601 identifying the supported payment applications (e.g., Visa, MasterCard). NFC POS terminal 601 and wallet app 203 may exchange additional CommandAPDUs and ResponseAPDUs through NFC kernel driver 206 and NFC hardware chip 208 to exchange additional non-sensitive data.

Next, the NFC POS terminal 601 POS sends a Generate Application Cryptogram command through NFC kernel driver 206 to wallet app 203, which initiates the secure transaction.

In particular, wallet app 203 enables NFC TEE driver 301, which in turns disables NFC kernel driver 206. The payment trusted app 201 then generates the cryptogram using an encrypted key stored in wallet app 203, which is transmitted to NFC POS terminal 601 through NFC TEE driver 301 and NFC hardware chip 208. After generation of the cryptogram, wallet app 203 disables NFC TEE driver 301 and NFC kernel driver 206 is re-enabled.

NFC POS terminal 601 and wallet app 203 may exchange additional non-sensitive CommandAPDUs and ResponseAPDUs through NFC kernel driver 206 and NFC hardware chip 208 to complete the transaction.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure.

Though embodiments have been described with reference to certain versions thereof; however, other versions are possible. Therefore, the spirit and scope of the embodiments should not be limited to the description of the preferred versions contained herein.

It is therefore contemplated that the claims will cover any such modifications or embodiments that fall within the true scope of the disclosure.

What is claimed is:

1. A mobile communications device comprising:
 a near field communications (NFC) port;
 a processor; and
 a memory containing instructions that, when executed by the processor, cause the mobile communications device to:
   implement a kernel space;
   execute a trusted application within a trusted execution environment (TEE) for processing protected data, wherein the TEE is separate from the kernel space;
   encrypt the protected data in the TEE;
   receive a request for the protected data from an external device communicatively connected to the mobile communications device via the NFC port;
   responsive to receiving the request from the external device, pass the encrypted protected data to an NFC driver executing within the TEE;
   responsive to passing the encrypted protected data to the NFC driver executing within the TEE, disable a second NFC driver executing within the kernel space; and
   pass the encrypted protected data from the NFC driver executing within the TEE to the NFC port.

2. The mobile communications device of claim 1, wherein the processor is further operable to execute an interface to receive additional encrypted protected data from an external source and transmit the additional encrypted protected data to the trusted application.

3. The mobile communications device of claim 1, wherein the memory further contains instructions that, when executed by the processor, cause the mobile communications device to:
execute a host card emulator (HCE) to manage transactions through the NFC port; and
execute the second NFC driver to exchange non-protected data between the NFC port and the HCE.

4. The mobile communications device of claim 3, wherein the NFC driver executing in the TEE has a higher privilege than the second NFC driver executing in the kernel space.

5. The mobile communications device of claim 2, wherein the interface comprises a host card emulator (HCE).

6. The mobile communications device of claim 1, wherein the protected data comprises an application protocol data unit (APDU).

7. The mobile communications device of claim 6, wherein the APDU comprises payment credentials for a credit transaction.

8. The mobile communications device of claim 2, wherein the TEE is associated with a certificate accessible by the external source through the interface to verify the TEE with a root certificate authority.

9. The mobile communications device of claim 1, wherein: the protected data comprises encrypted protected data transmitted to the NFC driver; and the NFC driver is further operable to decrypt the encrypted protected data prior to transmission to the NFC port.

10. A method of performing a transaction within a mobile device having a near field communications (NFC) port, the method comprising:
executing, by a processor of the mobile device, a trusted application within a trusted execution environment (TEE) to process protected data, wherein the TEE is outside of a kernel space implemented by the processor;
encrypting the protected data in the TEE;
receiving a request for the protected data from an external device, the external device communicatively connected to the mobile device via the NFC port;
responsive to receiving the request from the external device, passing the encrypted protected data to
an NFC driver executing within the TEE;
responsive to passing the encrypted protected data to the NFC driver executing within the TEE, disabling a second NFC driver executing within the kernel space; and
passing the encrypted protected data from the NFC driver executing within the TEE to the NFC port.

11. The method of claim 10, further comprising:
executing an interface to receive additional encrypted protected data from an external source and transmit the additional encrypted protected data to the trusted application.

12. The method of claim 10, further comprising:
executing the host card emulator (HCE) within the mobile device to manage transactions through the NFC port; and
executing the second NFC driver to exchange non-protected data between the NFC port and the HCE.

13. The method of claim 12, wherein the NFC driver executing in the TEE has a higher privilege than the second NFC driver.

14. The method of claim 11, wherein executing an interface comprises executing a host card emulator (HCE).

15. The method of claim 10, wherein the protected data comprises an application protocol data unit (APDU).

16. The method of claim 15, wherein the APDU comprises payment credentials for a credit transaction.

17. The method of claim 11, further comprising: accessing a certificate associated with the TEE by the external source through the interface to verify the TEE with a root certificate authority.

18. The method of claim 10, wherein:
the protected data comprises encrypted protected data transmitted to the NFC driver; and
the method further comprises decrypting the encrypted protected data with the NFC driver prior to transmission to the NFC port.

* * * * *